United States Patent [19]

Andersen

[11] 4,329,919
[45] May 18, 1982

[54] TIME-ENERGY CONSERVING LOW COST HOME PRESSURE COOKING SYSTEM

[76] Inventor: Ariel A. Andersen, 1074 Ash Ave., Provo, Utah 84601

[21] Appl. No.: 96,851

[22] Filed: Nov. 23, 1979

Related U.S. Application Data

[63] Continuation-in-part of Ser. No. 960,215, Nov. 13, 1978, abandoned.

[51] Int. Cl.³ .............................................. A23L 3/00
[52] U.S. Cl. ..................................... 99/359; 126/369; 126/389; 220/68; 220/300; 220/428; 422/110; 422/297; 422/299; 422/302; 426/407; 426/510; 426/511
[58] Field of Search ............... 426/401, 407, 523, 510, 426/511; 220/300, 428, 366, 68; 99/415, 417, 359; 126/369, 389; 422/25, 26, 307, 295-299, 110, 302

[56] References Cited

U.S. PATENT DOCUMENTS

| | | | |
|---|---|---|---|
| 234,865 | 11/1880 | Flanders | 126/389 |
| 273,913 | 3/1883 | Timby | 126/389 |
| 287,723 | 10/1883 | Rishel | 422/297 |
| 384,183 | 6/1888 | Woodard | 422/296 |
| 484,599 | 10/1892 | Marshfield | 126/369 |
| 627,330 | 6/1899 | Duvall | 99/410 |
| 945,105 | 1/1910 | Merrill | 126/389 |
| 976,969 | 11/1910 | Williams | 422/296 |
| 987,510 | 3/1911 | Thorne | 99/410 |
| 1,627,005 | 5/1927 | Allen | 220/366 |
| 1,673,164 | 6/1928 | Silen | 99/450 |
| 1,684,412 | 9/1928 | Reiner | 220/300 |
| 1,730,491 | 10/1929 | Allen | 126/369 |
| 1,740,205 | 12/1929 | Schmidt | 99/415 |
| 1,937,763 | 12/1933 | Kalning | 236/66 |
| 1,947,382 | 2/1934 | Crowley | 220/300 X |
| 2,177,123 | 10/1939 | Wittenberg | 220/300 |
| 2,357,634 | 9/1944 | Crites | 220/428 |
| 2,429,149 | 10/1947 | Wittenberg | 126/389 |
| 2,909,322 | 10/1959 | Blumberg | 236/66 |
| 2,947,304 | 8/1960 | Ashley | 99/347 |
| 3,395,695 | 8/1968 | Nagashimo et al. | 126/369 |
| 3,447,748 | 6/1969 | Saronni | 236/66 |
| 3,488,142 | 1/1970 | Cooper | 422/295 |
| 3,489,075 | 1/1970 | O'Reilly | 99/450 |
| 3,666,915 | 5/1972 | Denapoli | 422/297 |
| 3,735,922 | 5/1973 | Fujiwara | 236/66 |
| 3,949,577 | 4/1976 | Fleissner | 68/5 D |
| 3,973,480 | 8/1976 | Andersen | 126/389 X |
| 3,980,131 | 9/1976 | Perle et al. | 422/295 |
| 3,983,260 | 9/1976 | Ford | 422/26 |

FOREIGN PATENT DOCUMENTS

| | | | |
|---|---|---|---|
| 209003 | 10/1959 | Austria | 422/296 |
| 78000050 | 2/1979 | European Pat. Off. | |
| 376889 | 6/1923 | Fed. Rep. of Germany | 126/369 |
| 655853 | 4/1979 | U.S.S.R. | 422/295 |

Primary Examiner—Steven L. Weinstein
Attorney, Agent, or Firm—Lynn G. Foster

[57] ABSTRACT

An energy-time conserving low cost home pressure cooking system for canning, sterilizing and cooking food and the like, comprising method and apparatus, the illustrated apparatus comprising a pressure cooker having a short lower body or vessel and an elongated upper lid, sealed and releasably secured together when assembled at a relatively low elevation by fasteners locked and sealed (at a single annular seal site) and unlocked and unsealed at said low elevation merely by relative rotation of the body and the lid, a vented platform disposed a short distance above a small amount of water in a shallow reservoir in a lower compartment of the body of the pressure cooker, thus accommodating rapid generation of steam, when heated, which passes through the platform vents, accumulates at the top of the upper compartment and enlarges downwardly, with the air being efficiently exhausted substantially exclusive of steam, through an air escape-steam trap valved port in the side of the body of the pressure cooker just above the vented platform, under downward force of the accumulating steam.

1 Claim, 7 Drawing Figures

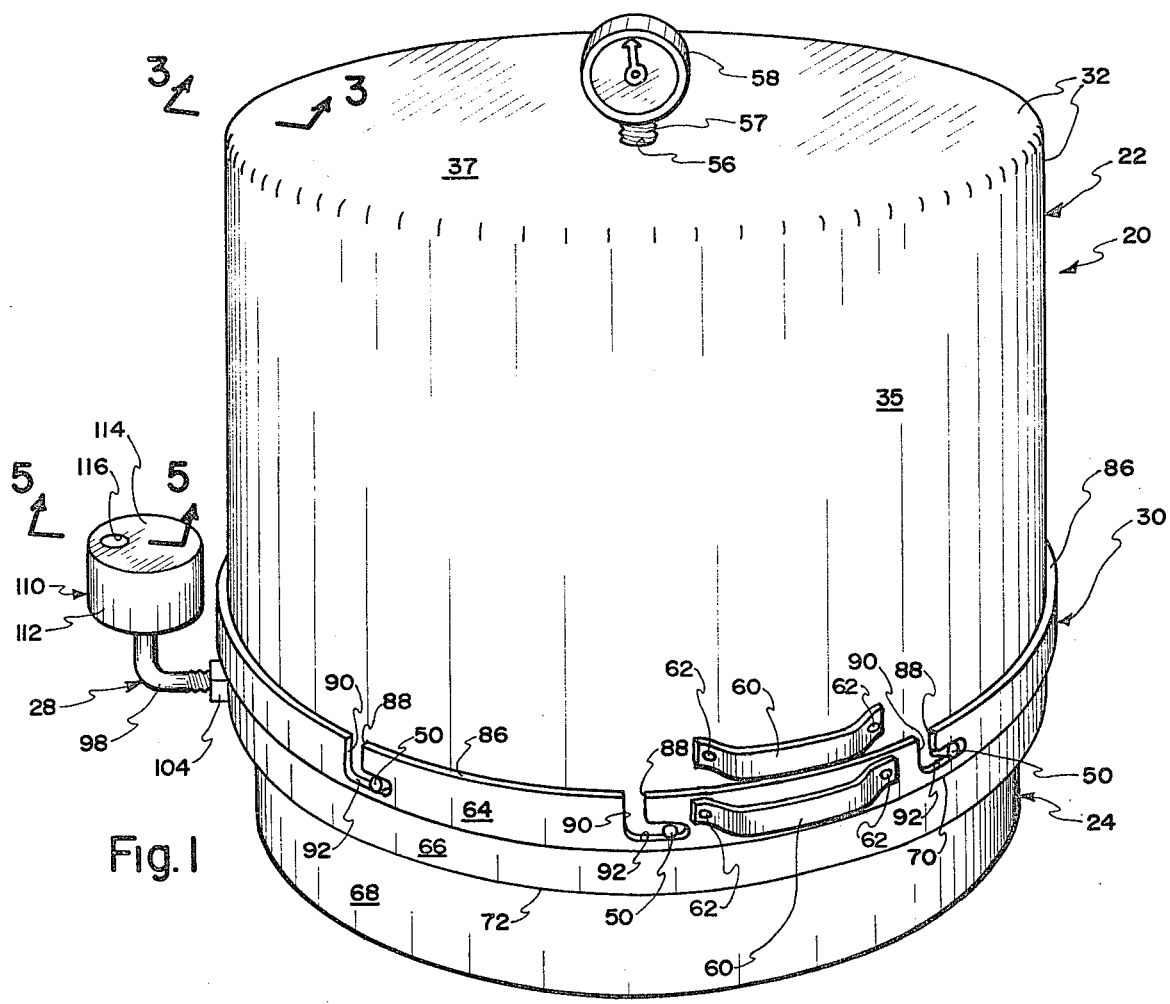
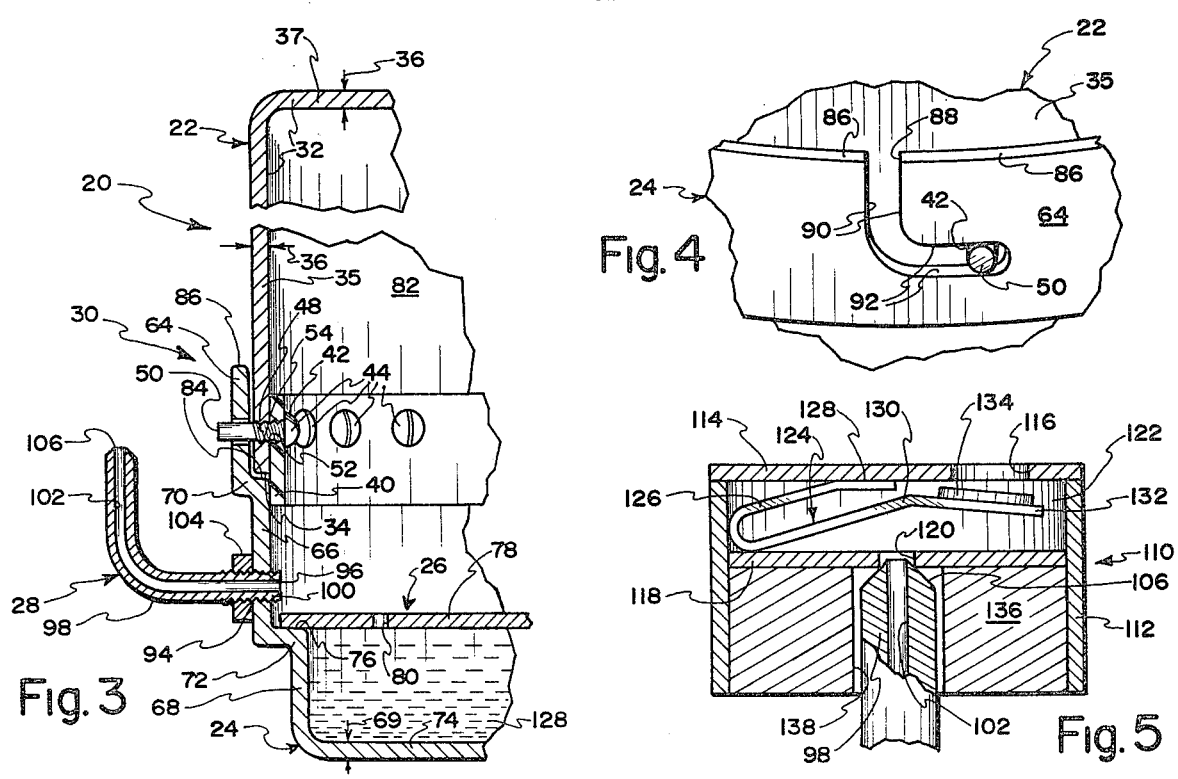

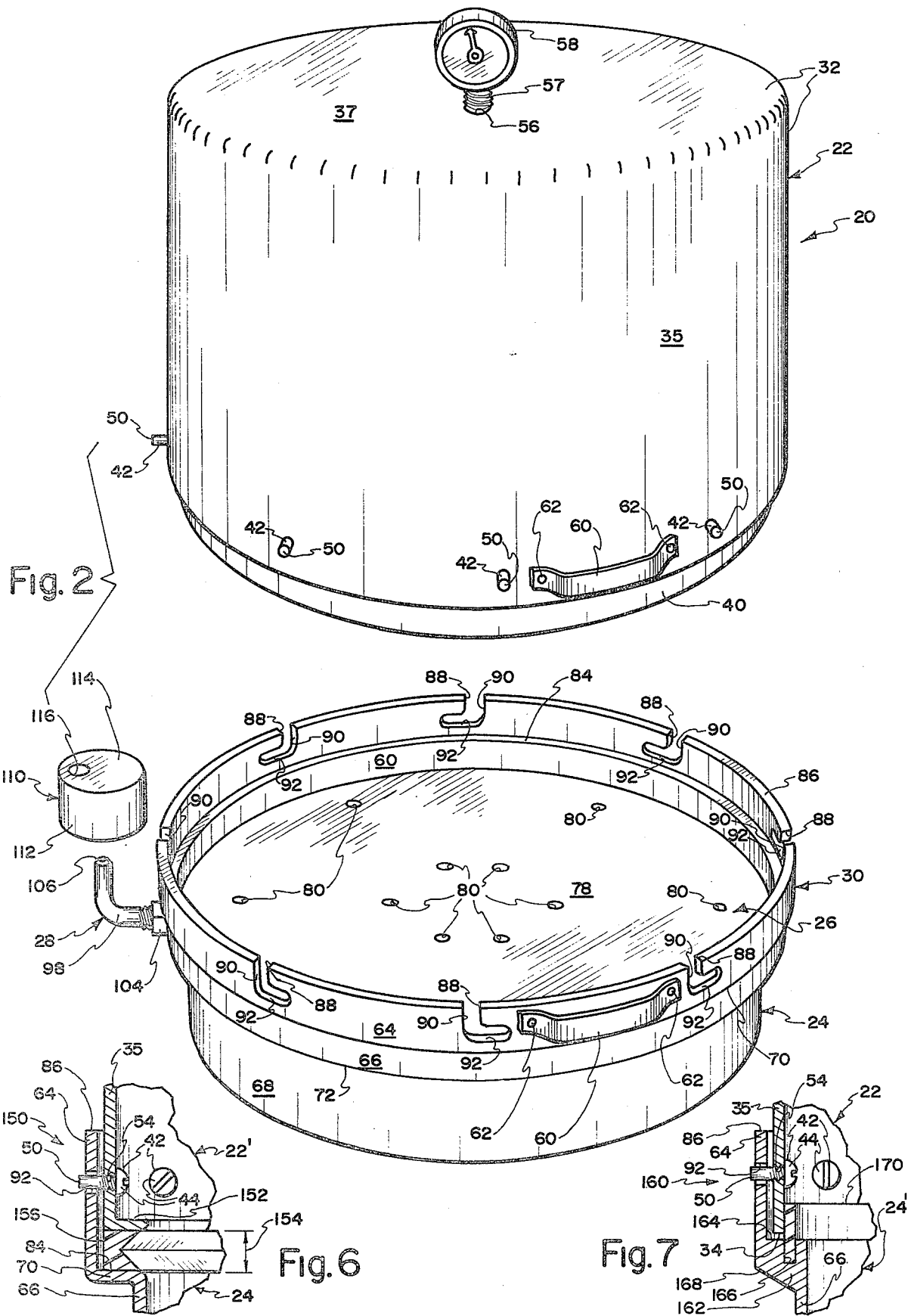

TIME-ENERGY CONSERVING LOW COST HOME PRESSURE COOKING SYSTEM

BACKGROUND

Continuity

This application is a continuation-in-part of my copending U.S. Patent Application Ser. No. 960,215, filed Nov. 13, 1978, now abandoned.

Field of Invention

The present invention relates generally to the home canning, sterilization and cooking of food and the like and more particularly to an energy-time conserving pressure cooking system, including method and apparatus.

Prior Art

It is well known and common place to equip a household pressure cooker with an exhaust site on the lid at the highest point of the cooker. This placement traditionally dictates the use of a relatively large quantity of water in the cooker to laboriously exhaust residual air from the cooker and to provide sufficient water adequate to create the requisite steam. Traditionally, once the residual air within the cooker has been exhausted, a certain amount of steam is continually released by use of a relief valve placed at the exhaust site. The described procedure, as is stated in various operating manuals, requires blowing steam on the order of ten minutes to exhaust all residual air, primarily, it has been discovered, due to the inherent continual turbulent mixing of steam as it elevates and air as it settles counter to the exhaust path. In short, the described procedure and equipment using the procedure require an excessive amount of time and the wasteful expenditure of a substantial amount of energy to create a pure steam cooking environment within the cooker.

Relatively heavy gauge, clamped pressure cookers have been the practice heretofore, which are expensive, complex and awkward to use.

BRIEF SUMMARY AND OBJECTS OF THE INVENTION

In summary, the present invention comprises a novel energy-time conserving low cost home pressure cooking system which is easy to use including method and apparatus, whereby minimal water is used in a shallow cooker reservoir comprising a short lower body, residual air is promptly and directly pushed from the cooker by the steam, at an exhaust site in the short body just above the vented platform which is just above the top of the water reservoir during start up without turbulent comingling of the air and steam in a relatively tall dome shaped lid. Substantial saving of energy and time is achieved and the pressure cooker is low cost, though highly reliable. Novelly the tall lid and the short body are releasably locked together at a plurality of male-female fastener sites along the annular perimeter of the pressure cooker directly juxtaposed the exhaust site merely by relative rotation of the lid on the body. A single peripheral annular seal prevents loss of steam at the lid-body interface. A novel automatic air exhaust—steam trap valve is also provided for use in accommodating said discharge of air, closure induced by the initial pure steam emission and retention within the cooker of substantially all of the water initially contained within the reservoir.

With the foregoing in mind, it is a primary object of the present invention to provide a novel energy-time low cost conserving home pressure cooking system, including method and apparatus.

It is a further important object of the present invention to provide a novel household pressure cooking system which utilizes a minimal amount of water.

An additional paramount object according to the present invention is the provision of an improved home pressure cooking system whereby residual air is promptly and directly pushed from the cooker by accumulating steam from at least one site immediately above a vented platform which separates a water reservoir from a cooking compartment or chamber.

A further significant object according to the present invention is the provision of a novel household pressure cooking system which minimizes turbulent comingling of air and steam at start up, accommodating rapid discharge of all air from the cooker and, accordingly, prompt creation of a pure steam environment within the cooker, which is essential for most efficient and rapid heating of the food being processed.

An additional principal object of the invention is the provision of a novel automatic air exhaust - steam trap valve.

A further dominate object of the present invention is the provision of a novel pressure cooker having a short lower body and tall dome shaped lid and a novel arrangement for releasably and sealingly connecting the two together.

These and other objects and features of the present invention will be apparent from the detailed description taken with reference to the accompanying drawings.

BRIEF DESCRIPTION OF THE DRAWINGS

FIG. 1 is a perspective representation of one presently preferred pressure cooker embodiment according to the present invention shown in its assembled, operating condition;

FIG. 2 is an exploded perspective representation of the cooker of FIG. 1;

FIG. 3 is an enlarged fragmentary cross sectional view of the cooker of FIG. 1 taken along line 3—3 thereof;

FIG. 4 is an enlarged fragmentary perspective of the fastener site by which the lid and body of the pressure cooker of FIG. 1 are removably connected;

FIG. 5 is a cross sectional representation of the automatic air exhaust—steam trap valve of the cooker of FIG. 1 taken along line 5—5 thereof.

FIG. 6 is a fragmentary cross sectional view of a second lap joint seal embodiment according to the present invention; and FIG. 7 is a fragmentary cross sectional view of a third lap joint seal embodiment according to the present invention.

DETAILED DESCRIPTION OF THE ILLUSTRATED EMBODIMENTS

Reference is now made to the drawings wherein like numerals are used to designate like parts throughout, the invention relating to a novel pressure cooking system, comprising method and apparatus for pressure cooking, sterilizing and home canning of food and the like and in particular vegetables, meats and non-acid foods. While variations may occur, in most instances, once residual air has been evacuated and a pure steam environment created within the pressure cooker of the system, the heat imparted to the cooker is preferably controlled so that the interior pressure is maintained at or about 15 pounds per square inch or at other desired levels.

With specific reference to FIGS. 1-3, one presently preferred pressure cooker, generally designated 20, according to the present invention is illustrated. Broadly, pressure cooker 20 comprises a vertical elongated dome shaped lid, generally designated 22, a vertically shallow body or vessel, generally designated 24, a perforated platform, generally designated 26, an air exhaust assembly, generally designated 28, a lower shallow compartment or water reservoir, designated 128, and perimeter lap joint just above the site of the air exhaust, which is generally designated 30. This improved pressure cooker can be made by any of the modern methods, e.g. cast aluminum, or pressed from sheet metal, but is preferably of sheet metal for durable and economical low cost fabrication.

The hollow lid 22 comprises a high profile inverted U-shaped housing 32. The housing 32 terminates in a downwardly directed annular edge 34. The diameter of housing 32 increases slightly from top to bottom. The sidewall 35 and the top 37 of the housing 32 have preferably an uniform gauge thickness 36. Depending from the sidewall 35 at the interior thereof is an annular elastomeric band seal 40. Seal 40 is vertically erect and of solid material. Seal 40 is secured flat against the inside surface of sidewall 35 so as to extend beyond edge 34 by a series of threaded static fasteners 42.

More specifically, each fastener 42 comprises a head 44 having a screw driver receiving slot and a shaft 46. The portion 48 of the shaft 46 near the head 44 being threaded and the distal end 50 being smooth. The threaded portion 50 passes snugly through an aperture 52 in the band seal 40 and is threadedly anchored in an aligned threaded bore 54 which passes through the sidewall 35. Thus, the radially exterior surface of the band seal 40 is held tightly contiguous with the interior surface of the sidewall 35.

The smooth distal end of each screw fastener 42 extends radially outward a substantial distance beyond the exterior of the sidewall 35 at the lap joint site 30, for a purpose yet to be explained. Screw fasteners 42 are illustrated as being located at 45° intervals, although other spacings could be used.

The top 37 of the lid 32 is centrally tapped at site 56 to receive a threaded shank 57 therein, shank 57 conventionally supporting a commercially available pressure gauge 58 in communication with the interior of the cooker.

A pair of handles 60 are riveted or otherwise suitably secured immediately opposite each other to the lid and the body, respectively, at sites 62 for manipulation of the cooker as a unit when assembled or separate or relative manipulation of the lid and the body.

Cooker body 24 is of one piece hollow construction and comprises three annular wall sections 64, 66 and 68 respectively interconnected by stepped shoulder portions 70 and 72. The lower end of annular wall section 68 integrally merges with flat bottom 74. The body 24 is illustrated as being of uniform thin wall thickness 69 throughout. The wall section 68 and the bottom 74 define and confine the shallow water reservoir 128.

Shoulder portion 72 comprises an interior annular shoulder 76 upon which horizontal plate 78 comprising platform 26 rests a short distance above the bottom 74 just above the plate 78. The diameter plate 78 is nearly the same as but slightly less than the inside diameter of wall section 66. Plate 78 comprises a plurality of apertures 80 through which steam emanating from the water in reservoir 128 passes into a chamber 82 above the plate 78 within the lid 32 and body 24.

Shoulder portion 70 comprises an interior annular shoulder 84 directly juxtaposed lid edge 34 in closely spaced relation. The lower portion of the inside surface of the band seal 40 is contiguous with the inside surface of wall section 66 adjacent shoulder 84. It is preferred that the diameter of the inside surface of the wall section 66 be slightly less than the diameter of the inside surface of the wall 35 to aid in causing seal 40 to seal against wall portion 66.

Annular wall section 64 exteriorly annularly overlaps the lower part of the lid sidewall 35 in closely spaced relation, terminating in an upwardly exposed annular edge 86.

Edge 86 is illustrated as being interrupted at 45° arcuate intervals by an L-shaped slot 88. See FIG. 4. Each slot 88 is sized, shaped, and located to snugly but removably receive the smooth end 50 of one static fastener 42. Each slot 88 comprises a vertically directed leg 90 and a horizontally directed leg 92, leg 90 being interposed between the edge 86 and the leg 92. Thus the lid 22 is united with the body 24 by vertically aligning the ends 50 of the fastener with the slot leg 90, lowering the lid until the ends 50 are contiguous with the slot legs 92, following which the lid and the body 24 are relatively horizontally rotated until the ends 50 are moved to the end of the slot legs 92, as shown in FIG. 4. The steps are reversed to separate the lid 22 from the body 24.

The air exhaust system 28 is mounted at the threaded bore site 94, to vent the chamber 82, as hereinafter more fully explained. More specifically, wall section 66 is tapped at threaded bore 96 immediately adjacent shoulder 76. The air exhaust assembly 28 comprises an L-shaped fitting 98 having a threaded horizontal end 100 which is snugly secured in threaded bore 96 of the cooker body 24. See FIG. 3. Fitting 98 comprises a hollow interior passageway 102 along its entire length accommodating fluid flow from the chamber 82 to the exterior of the cooker. A lock nut 104 holds the fitting 98 in the described and illustrated position against inadvertent removal. The passage 102 terminates at the elevated tapered tip 106 of the tube 98.

A weighted air exhaust - steam trap valve, generally designated 110 rests by force of gravity upon the tip 106 of the L-shaped tube 98, as illustrated in FIG. 1.

With reference to FIG. 5, the valve 110 comprises a thin wall hollow metal cylinder 112, a metal plate top 114 having an eccentric opening 116 disposed therein and an interior plate or partition 118 having a relatively small interior centrally disposed aperture 120.

The cylindrical shell 112, the top plate 114 and the interior plate 118 together define a hollow cylindrical chamber 122 in which a U-bent bi-metal strip 124 is disposed. An arm 126 is welded or otherwise suitably bonded at site 128 to the underside of the top plate 114, but may otherwise flex. The other arm 130 of the U-bent strip 124 is free to move vertically within the interior as temperature changes.

The angularly disposed cantilevered distal end 132 of the arm 130 terminates in closure pad 134 and is disposed in either of two positions, i.e. (a) the position illustrated in solid lines when the temperature of any gas escaping from the chamber 82, e.g. residual air, is below that of pure saturated steam and (b) the closed dotted position created when the cantilevered arm 130 is exposed to pure steam emitted from the chamber 82 through the fitting passageway 102, the cantilevered arm 130 being of bi-metal construction so as to bend into the closed position when exposed to sufficient elevated temperature (equal to or exceeding that of an environment of pure saturated steam).

The valve 110 further comprises an annular metal weight 136, the exterior of which is welded or otherwise suitably secured to the interior of the cylindrical wall 112. The body 136 defines a central aperture 138 which is somewhat larger than the outside diameter of the tube 98. The central aperture 120 of the intermediate plate 118 is slightly greater than the diameter of the passageway 102 of the tube 98 but substantially less than the diameter of the bore 138 of the annular weight 136 so that the valve 110 at the aperture 120 rests by gravity upon the beveled tip 106 of the tube 98, as best illustrated in FIG. 5. Thus, the valve 110 becomes automatically disposed in its illustrated open position as air is exhausted from the chamber 82 of the cooker 20, but rapidly and automatically closes responsive to the emission of pure steam from the cooker. The valve 110 further comprises a total weight such that it will be lifted off tip 106 of tube 98 before steam pressure reaches a danger point but slightly above the recommended maximum pressure for canning, thus permitting steam to escape downwardly between the tube 98 and the weight 136, and prevent any explosive pressure from developing.

From the foregoing, it should be appreciated that the interior of the cooker 20 (cooker enclosure 82) comprises a relatively thin reservoir 128 of water which may be rapidly caused to generate steam, a perforated platform 26 a small distance above the water line of the reservoir 128 through which the steam elevates into a vertically elongated steam receiving chamber 82 above the perforated platform 26 and within the body 24 and the lid 22. Food (to be sterilized, canned and/or cooked) is placed upon the platform, typically in bottles, cans, containers or the like. After food is appropriately caused to rest, in bottles, etc. or otherwise, upon the top of the plate 78 and a shallow layer of water is placed below the plate 78 to form the reservoir 128. At no time is the food disposed within the water reservoir. The lid 22 is lowered over the body so that the ends 50 of the fasteners 42 pass downward through the vertical slot legs 90, following which the lid is rotated to bring the end 50 into the position shown in FIG. 4 and the lap joint 30 into its closed and sealed position of FIG. 3.

Residual air initially within the cooker 20, after it is closed and sealed, is exhausted downwardly and laterally directly adjacent the top of the perforated plate 78 through the air exhaust assembly 28, which is disposed spaced from the top of the steam receiving chamber 82, the lid 22 and the sealed lap joint 30 between the lid 22 and the body 24.

In a short time with proper application of heat, generation of steam due to the shallow nature of the reservoir 128 occurs rapidly. The time required using a 2000 watt burner to generate steam and place the chamber 82 under pure steam pressure is on the order of 17-18 minutes until the automatic valve closes with seven quart bottles of water in the cooker, when compared with 42 minutes until the valve closed following U.S.-D.A. instructions, with seven quart bottles of water in the cooker required by the prior art pressure cookers.

Steam initially generated from the reservoir 128 elevates through the vents 80 in the platform 26 and continues in somewhat of a chimney pattern to the top of the steam receiving chamber adjacent the top 37 of the lid 22, where the steam accumulates. As steam is continuously generated from reservoir 128, it is continually accumulated first at the top of the steam receiving chamber of the cooker and then, progressively, downwardly causing the air to be forced in a downward fashion.

The described countermigration of the steam and air is substantially mutually exclusive with negligible comingling or turbulence, primarily due to the difference in density between the two gases. The residual air which contacts the top surface of the perforated plate 78 in its downward displacement seeks to move in the direction of least resistance, i.e. toward the air exhaust assembly 28. Thus, the residual air moves along or across the top surface of the plate 78 and is evacuated from the cooker along the passageway 102 to the atmosphere through valve opening 116.

The described accumulation of steam the downward push exerted by the steam upon the air and the evacuation of the air along the top of the perforated plate 78 to the atmosphere through the exhaust assembly 28 continues substantially exclusive of exhausting steam until the air has been fully evacuated and a pure steam environment exists within the chamber 82, the temperature of which causes the closure pad 134 to seat against the interior surface of the top plate 114 closing the opening 116 of the valve 110 against fluid flow.

By the time the air is all out, the containers of food have been heated to near steam temperature by steam condensing on the containers with the condensed steam (water) returning to the reservoir for recycling. It has been determined that the water loss from the reservoir 128 through creation of steam and loss of that steam through the exhaust assembly 28 required to create a pure steam environment within the cooker is on the order of one ounce of water (in contrast with eleven ounces normally lost to evacuate residual air from conventional pressure cookers using the recommended "blow" time of on the order of ten minutes).

Furthermore, using a 2000 watt burner the time required for said complete evacuation of residual air plus heating of seven quart bottles of food requires only 17–18 minutes using cooker 20, as opposed to 42 minutes for complete evacuation of air plus heating of food including ten minutes of blow time already mentioned, when using conventional pressure cookers. Accordingly, the amount of time required to cook a given type and quantity of food within a cooker according to the present invention is reduced by about 21 minutes, when compared with the time required using prior art mechanisms and procedures.

Most significantly, in order to cook an identical type and quantity of food, cooker 20 required the expenditure of only 1.566 kilowatt hours of electrical energy as opposed to 2.200 kilowatt hours used by prior art pressure cookers. Even more significant the food is more reliably and accurately processed.

Specific reference is now made to FIG. 6 which illustrates a second presently preferred lap joint embodiment, generally designated 150, according to the present invention. Lap joint configuration 150 is intended to be utilized in rotationally securing pressure cooker lid 22' to the previously described pressure cooker body 24. Since pressure cooker body 24 is identical to the pressure cooker body described in conjunction with the embodiment of FIGS. 1-5, no further description is needed. Identical numerals have been used to designate the various parts of body 24 illustrated in FIG. 6.

The lid 22' differs from the previously described lid 22 only in that the lower annular edge of the housing sidewall 35 is turned 90 degrees inwardly to form a short radial flange 152. The flange 152 is fabricated in such a fashion so as to form, when in the assembled, closed position illustrated in FIG. 6, a substantial distance 154 is provided between the lower surface of the flange 152 and the top surface or shoulder 84 of stepped portion 70 of the body 24.

An annular seal 156 is interposed between the bottom surface of the flange 152 and the shoulder surface 84. The unstressed vertical dimension of the seal 156 is slightly larger than the dimension 154 so that upon application of downward force on the lid 22' followed by relative rotation of the lid 22' in respect to the body 24 will cause the seal 156 to compress into the position illustrated in FIG. 6. In this position the seal 156 exerts a vertical tensile force which creates and maintains a sealed relationship with the bottom surface of the flange 152 and the shoulder 84. While other configurations could be used, the seal 156 is illustrated as having a smooth outside annular surface, top and bottom smooth surfaces in parallel horizontal planes and a V-shaped lower or interior surface. Accordingly, steam pressure, which acts normal to surfaces which it engages, will cause the V-shaped legs to spread when cooking conditions exist in the pressure cooker comprising the lap joint 150 thereby insuring that steam leakage across the seal 156 does not occur.

It is to be noted that the array of fasteners 42, as previously described, is retained. However, each fastener 42 is threaded into the wall 35 of the lid 22' at threaded bore 54 so that the head 44 thereof is directly contiguous with the interior surface of the wall 35.

Reference is now made to FIG. 7 which illustrates a third presently preferred lap joint embodiment 160 in accordance with the present invention. The lap joint 160 comprises a pressure cooker in accordance with the present invention comprising a lid 22, as previously described, and a body 24'. This particular embodiment lends itself well to permanent mold casting fabrication of pressure cookers.

With the exception of the fasteners 42 being threaded into snug contiguous relationship with the inside surface of the wall 35, the lid 22 of FIG. 7 is identical to the previously described lid of the embodiment of FIGS. 1-5 and is correspondingly numbered.

Body 24' differs from the previously described body 24 in that instead of joining wall portions 64 and 66 by transition section 70, wall portion 64 and 66 are interconnected by a transition section 162. Transition section 162 comprises an upper interior shoulder 164 which is radially disposed and traverses a substantial radial distance. Shoulder 164 is interrupted by a U-shaped annular open slot 166. The exterior of the transition section 162 comprises a tapered surface 168.

A band seal 170 is sized and shaped so as to accommodate being force-fit into the annular groove 166 and there retained during use and non-use. The groove 166 is located along the shoulder 164 so that the seal 170 along its upper exterior surface is caused to be snugly contiguous with the interior surface of the lid wall 35. Accordingly, the band seal 170 prevents steam leakage across the annular groove 166 and also along the interior surface of the wall 35. Thus, lap joint 160 is steam tight. Furthermore, as steam pressure is developed within the interior of the pressure cooker comprising the lap joint 160, such pressure is caused to be normally exerted upon the exposed interior surface of the seal 170 tightening the seal against the interior wall surface 35 further insuring against loss of steam at lap joint 160.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for pressure canning, pressure sterilizing and pressure cooking foods and the like with steam comprising:

an enclosure comprising pressure cooker hollow, vertically shallow body means and pressure cooker hollow, vertically elongated lid means disposed above the cooker body means, the body means and the lid means each comprising wall means;

annular lap joint means between the body means and the lid means at a relatively low elevation on the apparatus, the lap joint means comprising a perimeter site where the wall means of the lid means and the wall means of the body means overlap and a plurality of male and a plurality of interrelated L-shaped female fastener means carried by the lid means and the body means, the fastener means being clamped and unclamped at the perimeter site solely by relative rotation of the lid means and the body means;

annular elastomeric seal means interposed between the body means and the lid means interiorly at the lap joint means to create a first annular sealing site with the lid means and a second annular sealing site with the body means to prevent air and steam leakage, the annular seal means comprising surface means which responsive to increasing vapor pressure within the apparatus correspondingly causes an increase in the sealing force at both the first and second sealing sites;

a shallow water reservoir at the bottom interior of the enclosure;

food container supporting perforated platform means disposed a small distance above the bottom interior of the enclosure immediately above the top of the water reservoir;

the region of the enclosure above the perforated platform means and below the lid means comprising a steam-receiving chamber in which said containers of food and the like are cooked, sterilized and/or canned;

air escape-steam trap valved port means carried by the body means below the lap joint means extending entirely through the wall of the body means immediately above the perforated platform means whereby, upon the application of heat to the water reservoir and generation of steam, steam passing through the perforations of the platform means thereafter becomes disposed adjacent the lid and, upon continued accumulation, fills from top down to force residual air within the enclosure downward in the chamber and laterally outward from the enclosure through the air escape-steam trap valved port means and simultaneously forces against the seal means to prevent escape of steam at the lap joint site.

* * * * *